US007669840B2

(12) United States Patent
Xu et al.

(10) Patent No.: US 7,669,840 B2
(45) Date of Patent: Mar. 2, 2010

(54) HOOK CLAMP UNIT

(75) Inventors: Liu Xu, Troy, MI (US); Douglas D. Colby, Clarkston, MI (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 11/338,463

(22) Filed: Jan. 23, 2006

(65) Prior Publication Data

US 2006/0163790 A1 Jul. 27, 2006

Related U.S. Application Data

(60) Provisional application No. 60/647,298, filed on Jan. 25, 2005.

(51) Int. Cl.
*B23Q 3/08* (2006.01)

(52) U.S. Cl. .......................................... 269/32; 269/34

(58) Field of Classification Search .................. 269/32, 269/49, 47, 34, 52, 93; 279/2.06, 2.09; 294/100; 200/302.3, 339, 253, 335
See application file for complete search history.

(56) References Cited

U.S. PATENT DOCUMENTS 1,037,631 A * 9/1912 Jones .......................... 74/566
4,618,131 A 10/1986 Campisi et al.
4,958,813 A 9/1990 Dykstra
5,407,243 A * 4/1995 Riemann .................... 294/100
5,695,178 A * 12/1997 Lenzkes ...................... 269/99
6,102,383 A 8/2000 Tunkers
6,364,300 B1 4/2002 Kita
6,378,855 B1 4/2002 Sawdon et al.
6,439,560 B2 8/2002 Sawada et al.
6,698,736 B2 3/2004 Dugas et al.
6,889,968 B1 * 5/2005 Wong .......................... 269/91
6,976,671 B2 * 12/2005 Migliori ...................... 269/32
7,144,002 B2 * 12/2006 Zhao et al. .................... 269/32
7,178,797 B2 * 2/2007 Migliori ...................... 269/32
2002/0093131 A1 7/2002 Dugas et al.
2004/0070130 A1 4/2004 Pavlik et al.
2005/0017424 A1 * 1/2005 Migliori ...................... 269/32

FOREIGN PATENT DOCUMENTS

EP 1 025 950 A2 8/2000
EP 1 393 861 A2 3/2004

* cited by examiner

*Primary Examiner*—Lee D Wilson
(74) *Attorney, Agent, or Firm*—Harness, Dickey & Pierce, P.L.C.

(57) ABSTRACT

A hook unit for use with a clamp in a manufacturing environment. The hook unit includes a base and a sliding member arranged therein. A hook extends through the base and sliding member. The hook and sliding member form a barrier for the clamp.

19 Claims, 1 Drawing Sheet

HOOK CLAMP UNIT

This application claims the benefit of Provisional Application Ser. No. 60/647,298, filed Jan. 25, 2005

BACKGROUND OF THE INVENTION

Hook pin assemblies have been known for numerous years in robotic and manufacturing applications. A hook pin assembly in one application may be used with a robot end effector to locate and clamp a work piece or material to a specified work station such that an operation can be performed on the work piece. One prior art example hook pin assembly can be found in the automobile industry, there the hook pin assemblies are used to locate and clamp or secure an automobile body to a frame assembly, wherein the frame assembly is connected to and moves the automobile body down a manufacturing line. The assemblies are used in conjunction with the hook mechanism which enters the hook pin assembly and clamps against a stop surface. Generally, the hook is placed with a force thereupon to ensure the hook is not disengaged from the pin during operation of the work piece in the work environment.

Some prior art hook pin assemblies include a single unitary hook pin unit. These prior art hook pin units generally have a rectangular portion that includes an appendage extending from one side of the rectangular portion. The prior art hook pin units also include a channel through the appendage of the hook pin unit along an axis of the appendage. The channel extends completely through both outer surfaces of the appendage and creates a locking surface to which a hook will engage during work piece operations. The rectangular portions of a prior art hook pin unit includes a plurality of holes such that it can be connected to an end effector of a robot or to a work piece unit depending on the configuration of the work environment.

However, there have been problems in the prior art with the hook pin units such that if a pin fails the entire line has to be stopped to replace the hook pin unit. This reduces productivity and increases the cost of manufacturing the work piece or article. Furthermore, the one piece pin units are more complicated to make and often tend to be very heavy. Also the prior art hook pin units are not as robust and have to be replaced frequently. Furthermore many of the prior art hook pin units are very susceptible to weld slag contamination thus reducing the reliability and life cycle of such hook pin units. Furthermore, these hook pin units require the use of a pin whereas in many manufacturers are now requiring just a hook without having the pin or protrusion as part of the unit.

Therefore, there is a need in the art for an improved hook assembly that reduce costs, is stronger, more robust, is immune to weld slag, and has a longer life cycle while being easier to maintain and repair in the work place environment.

SUMMARY OF THE INVENTION

According to the present invention, the foregoing and other objects and advantages are obtained by a novel design for an improved hook unit having weld slag protection for use in an automotive or other known manufacturing environments. The hook unit includes a hook extending through a base member having a T-slot therein. The hook also is arranged through an orifice of a T-shaped member which is arranged in the T-slot of the base member. The T-shaped member is capable of movement within the T-shaped slot of the base member. The hook is capable of moving in a vertical or up and down direction with respect to the clamp and in a horizontal direction with respect to the base member of the clamp.

Other objects, features and advantages of the present invention will become apparent from the subsequent description and appended claims taken in conjunction with the accompanying drawings.

DESCRIPTION OF THE PREFERRED EMBODIMENT(S) AND BEST MODE FOR CARRYING OUT THE INVENTION

Figure 1:
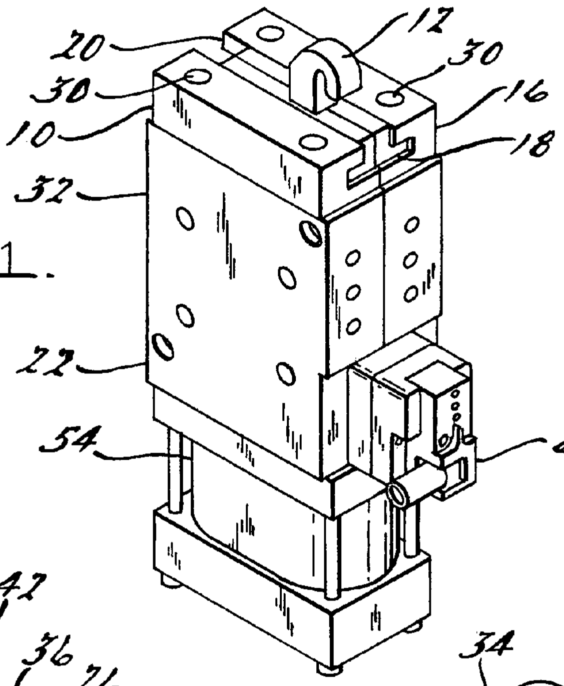
FIG. 1 shows a hook unit on a clamp in perspective according to the present invention.
Figure 2:
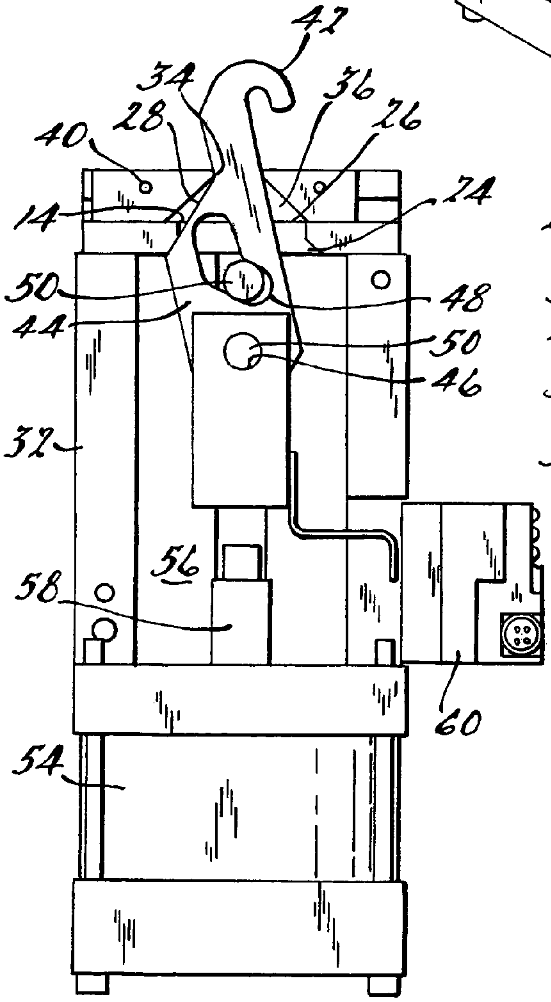
FIG. 2 shows a cross section of a hook unit on a clamp in an open position according to the present invention.
Figure 3:
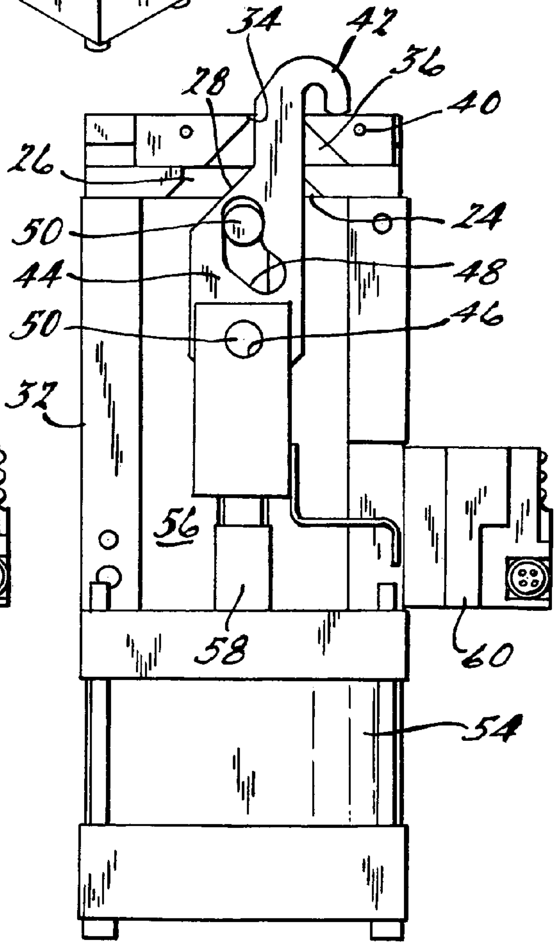
FIG. 3 shows a cross section of a hook unit or a clamp in a closed position according to the present invention.

Referring to the drawings, FIGS. 1 through 3 show an embodiment of the hook unit 10 according to the present invention. The hook unit 10 includes a hook member 12 arranged in an orifice 14 of a base member 16 of the hook unit 10. The hook unit 10 further includes a T-slot 18 arranged along a length of the base member 16. The hook unit 10 also includes a T-shaped member 20 arranged within the T-slot 18 of the base member 16. The hook unit 10 of the present invention also is generally impervious to and offers protection from weld slag and other contaminates which are found in the automotive manufacturing environment. The T-shaped member 20 will provide a barrier to any weld slag that attempts to enter the hook unit 10 or clamp 22 in both an unclamped or unhooked position and hooked or clamped position. The base member 16 and the T-shaped member 20 will provide a protection against weld slag entering the clamp unit 22.

FIGS. 1 through 3 show a hook unit 10 attached to a clamp or other component 22. It should be noted that the clamp 22 shown is just one possible embodiment that the hook unit 10 may be attached thereto and that many other combinations and components, including power clamps, electric clamps, manual clamps, pivot units, hydraulic clamps, electromechanical clamps, or any other known clamps or type of operational component may be used with the hook unit 10 herein.

The hook unit 10 includes a base member 16 that is connected to either the end effector, robot, tool, component, or clamp for use in the work environment or to a work piece which would be worked on in the manufacturing environment. Generally, the base member 16 can have any shape, such as but not limited to a rectangle, a square, a circle, oval, a random shaped, etc. The base member 16 as shown generally has a rectangular shape. The base member 16 includes a T-shaped slot or T-slot 18 along a center point or line thereof. It should be noted that the clamp 22 as shown in FIGS. 1 and 2 is comprised of a two piece base member 16 that when placed side to side and abutted against one another will create the T-slot 18 as described above. Therefore, generally each half of the two piece base member 16 would have a generally C-shaped cross section. However it should be noted that the base member 16 may also be made of a single piece. As shown in FIG. 2, the base member 16 has an orifice 14 through a surface thereof to allow for the hook member 12 to be arranged therein. As shown in FIG. 2, the base member orifice 14 is defined by an angled surface 24 on one portion thereof followed by a vertical surface 26 extending from one end of the angled surface 24. The angled surface 24 will mate with and interact with an angled surface 28 on the hook member 12. The orifice 14 is arranged at a mid point or center line of the surface of the base member 16 and aligns with the T-slot 18 in the base member 16. This will allow the hook member 12 to pass through the base member 16 surface and through the T-slot 18 to project above the base member 16 in order to interact with and hold the component or work piece in the manufacturing environment. The orifice 14 in the base member 16 is a predetermined size and may be adjusted depending on the design requirements and holding capabilities needed for the hook member 12. It should be noted that the base member 16 generally is made of a steel material, however any other metal, hard plastic, ceramic, composite, or the like may be used to form the base member or base members 16 for the hook unit 10. It should also be noted that the base member 16 has a plurality of fastening orifices 30 through a surface thereof to allow for connection of the base member 16 to the clamp body 32 by any known fastener. It should also be noted that any other type or known fastening methods, such as welding, mechanical fastening, chemical fastening, or the like may also be used to secure the base member 16 to the body of the clamp or component 32. The base member 16 may also include a slot 18 of any known shape.

The hook unit 10 also includes a T-shaped member 20 that is arranged within the T-slot 18 of the base member 16. As shown in FIGS. 1 through 3 the T-shaped member 20 is a two piece T-shape member 20 each individual member generally having an L-shaped cross section which are placed in contact with one another in a predetermined position to form the T-shape member 20 shown. It should be noted that a single piece T-shape member 20 may also be used for the present invention. Any other known shape may also be used for the member 20. The T-shape member 20 is arranged within the T-slot 18 of the base member 16. The T-shape member 20 is slidably movable along the entire length of the T-slot 18 of the base member 16. In the embodiment shown the T-shaped member 20 generally is shorter in length that that of the base member 16. However, it should be noted that the T-shaped member 20 may be any length and may even extend from each end of the base member 16. The T-shaped member 20 is capable of movement within the T-slot 18 to allow for contact with multiple sized and oriented work pieces. The T-shaped member 20 has an orifice along a center line thereof through which the hook member 12 will be arranged. The orifice 34 has a predetermined shape that will mimic that of the hook member 12. The clearance between the hook member 12 and the orifice 34 shall be generally small such that weld slag or other contaminates will not be capable of passing through in any large quantity to contaminate the internal mechanisms of the clamp or component 22. The T-shaped members 20 have a triangular shaped cavity 36 extending from the edges of the orifice 34 on a top surface of the T-shaped members 20. The cavity 36 will extend at a predetermined angle to the bottom surface of the T-shaped member 20. This will in cross section, as shown in FIG. 2, give a generally triangular shape with a flat top to the orifice 34 through the T-shaped member 20. The angle of the cavity 36 of the T-shaped member 20 will mate with and interact with the angle of the surface 28 on the hook member 12. It is also shown in FIG. 2 that one of the pieces, the two piece T-shape member 20, may have an orifice 40 therein while the other member may have a pin 40 therein which will align with the orifice of the opposite T-shaped member 20. This will allow the T-shaped member 20 to be fixed with respect to one another around the hook member 12. It should be noted that the T-shaped member 20 generally is made of a steel material, however any other metal, plastic, ceramic, composite, or the like material may be used for the T-shaped member 20.

The hook unit 10 also includes a hook member 12. The hook member 12 is arranged within the orifices of the base member 16 and the T-shaped member 20. It should be noted that the hook member 12 is generally made of a steel material, however any other metal, ceramic, composite, plastic or the like may be used for the hook member 12. The hook member 12 includes a hook arm 42 extending from or near one end of the body 44 thereof. The hook arm 42 generally extends from an end of the hook member body 44 with a U-shaped appearance. The hook arm 42 extends from the hook member body 44 at a predetermined position on the body 44. The hook arm 42 includes a generally flat end that will be used to interact with a work piece or component being held by the hook member 12. The hook arm 42 will interact with the orifice 34 in the T-shaped member 20 to create a barrier to weld slag and other contaminates from entering the internal components of the clamp 22 or other component being used in the manufacturing environment. As shown in FIG. 2 the hook member 12 is at or near its open or unhooked position such that the hook member 12 is extended away from the clamp 32 such that the angled surface 28 of the hook member 12 will interact with the angled surface of the T-shape member 20. This will ensure that the hook member 12, in its unclamped or unhooked position, will still seal the internal components of the clamp 32 from weld slag or other contaminates in the manufacturing environment. FIG. 2 shows the hook member 12 at or near its fully open position. It should be noted that the angle of the surface that interacts with the angled surfaces of the T-shaped member 20 or base member 16 may be changed to coordinate with specific design requirements of the clamp 22 in the manufacturing environment. It is also contemplated to put a sealing mechanism between the surface of the hook member 12 and the orifices of the T-shaped member 20 and base member 16. Such a seal is not shown in the embodiments of FIGS. 1 and 2. It should be noted that the hook arm 42 of the hook member 12 has a generally uniformed size such that when the hook member 12 is in its closed or hooked position the hook member 12 will still assist in forming a barrier to weld slag or other contaminates from entering the clamping mechanism 22 because of the generally precise fit between the shape of the hook arm 42 of the hook member 12 and the orifice 34 through the T-shaped member 20.

The hook member 12 also includes a generally circular orifice 46 at one end thereof and a generally L-shaped orifice 48 or track located near a center portion of the hook member 12. It should be noted that the orifices 46, 48 may be of any predetermined shape, and that the L-shaped orifice 48 may be of any predetermined length and include any predetermined angle therein to allow for proper positioning of the hook arm 42 with respect to the component being hooked in both the open and closed positions. As shown in FIG. 2, a pin, fastener, or the like 50 is arranged within the L-shaped orifice 48 of the hook member 12 and a pin, fastener or the like 50 is arranged in the circular orifice 46 of the hook member 12 and allows for the hook member 12 to rotate with respect to the internal linkage of the clamp 22. It should be noted that a pin 50 is generally used in the present invention but any other type of fastener, dowel, pole, or the like may be used in either the orifices 46, 48. It should further be noted that the orifice 46 may be of any known shape but in the embodiment shown it is generally of a circular design. The internal linkage of the clamp 22 will rotate the hook member 12 from its unclamped or unhooked position to a hooked position or clamped position. The internal linkages of the clamp 22 will urge the hook member 12 to travel in a downward position with relation to the base member 16 and T-shaped member 20 until the pin member 50 is in contact with or near the top portion of the L-shaped orifice 48, see FIG. 3. The pin 50 follows the L-shaped orifice or track 48 and will secure the hook arm 42 into its hooked or clamped position. Therefore, it should be noted that it is contemplated to change the shape and length of the orifice 48 to any known shape or length in order to allow for a variety of hooked or clamped variations in the manufacturing environment.

As shown in FIGS. 1 and 2 the clamp 22 is one of many types that may be used with the present hook unit 10. The clamp 22 shown has a cylinder 54 connected to a base 32 of the clamp 22 wherein the base 32 has a bore 56 therein. The cylinder 54 generally will have a piston therein with a rod 58 extending there from into the bore 56 of the base 32 of the clamp 22. The internal linkage of the clamp 22 is not shown in detail in the drawing of FIG. 2. However, the drawing of FIG. 2 shows an electric pack 60 connected to a side of the base 32 of the clamp 22 to allow for electrical sensing of the position of the clamp 22 in the manufacturing environment. The clamp 22 shown may be capable of displaying when the clamp 22 is moving to a clamped position, in a fully clamped or in a fully open position by either audible or visual signal, via light and buzzers on the electrical pack 60. The electrical pack 60 will also have an electrical connection that will connect it to a computer or other device for controlling the electrical components of the clamp 22. It should also be noted that the clamp 22 may be completely electrical and hence would not use a cylinder but solenoids to create the movement for the clamp 22 in order to create the movement of such linkages used to move the hook member 12 into its clamped or unclamped position. The clamp 22 may also include a rest block 62 arranged on a surface of the base member 16. A shim pack 64 may also be arranged between the rest block 62 and base member 16. The rest block 62 will receive and hold the hook 42 when the clamp is fully closed or clamped.

In operation, the hook member 12 will move between a hooked and unhooked position while providing a barrier which will protect the hook unit 10 from weld slag found in the manufacturing environment. The barrier is formed by the interaction between a surface of the T-shaped member 20 located within a T-slot 18 of a base member 16 and a hook arm 42 of the hook member 12. This barrier is in place when the hook arm 42 is either in its fully hooked or clamped position and fully unhooked or unclamped position. This will allow for the hook unit 10 to operate in the manufacturing environment in a much more durable manner thus increasing the longevity and decreasing any down time of the manufacturing line due to replacement and cleaning of hook units. It also prevents early contamination of the internal components of the clamp member or component 22 operating in the manufacturing environment. It should also be noted that the hook unit 10 is removable, and thus easier to clean, thus reducing down time on the manufacturing line. The hook member 12 and hook unit 10 may be designed and have a variety of designs to change to specific requirements and strengths needed for manufacturing jobs in a variety of industries including the automotive and any other known industrial, chemical, or manufacturing industry.

Other contemplated embodiments may also be designed and shown from the above mentioned discussion and the attached drawings to include any known designs in the art for such hook assemblies to create a hook unit instead of the traditional prior art one or two piece hook pin units.

While it may be apparent that the preferred embodiments of the invention disclosed are well calculated to fill benefits, objects, or advantages of the invention, it will be appreciated that the invention is susceptible to modifications, variations and change without departing from the proper scope of the invention as shown.

What is claimed is:

1. A hook unit for use in manufacturing, said hook unit including:

a base having a slot;

a hook extending through said base, said hook having a body and an arm extending from the body, said arm including a generally uniformed size;

a sliding member slidably arranged in said slot, said hook arm extending through an orifice in said sliding member, a generally precise fit being achieved between said arm and orifice for prohibiting contaminants from entering said hook unit, said orifice becoming larger as said arm extends through said sliding member providing additional area for receiving a portion of said hook body below a top surface of said sliding member while said hook arm passes through the orifice in said top surface of said sliding member and said hook body is maintained below said top surface wherein said orifice is in said sliding member allowing said orifice to translate reciprocally back and forth in a linear path in said slot moving said orifice with said sliding member.

2. The hook unit of claim 1 wherein said slot is a T-slot.

3. The hook unit of claim 1 wherein said base having two pieces.

4. The hook unit of claim 1 wherein said slot extends an entire length of said base.

5. The hook unit of claim 1 wherein said base having an orifice therein.

6. The hook unit of claim 5 wherein said orifice having said angled surface of said base extending therefrom.

7. The hook unit of claim 5 wherein said hook extending through said orifice.

8. The hook unit of claim 1 wherein said base having a plurality of fastening orifices therethrough.

9. The hook unit of claim 1 wherein said hook having a body, an arm, and a generally L-shaped orifice through said body.

10. The hook unit of claim 1 wherein said hook and said sliding member create a barrier.

11. The hook unit of claim 1 wherein said sliding member generally having a T-shaped cross section.

12. The hook unit of claim 1 wherein said sliding member orifice having angled surfaces extending therefrom through said sliding member.

13. The hook unit of claim 12 wherein said hook moves within said orifice in an in and out motion.

14. A clamp for use in manufacturing, said clamp including:

a body;

a hook unit base secured to said body on an end thereof, said hook unit base having an orifice therethrough and a T-slot therein;

a T-shaped member slidingly arranged within said T-slot, said T-shaped member having an orifice therethrough; and a hook arranged within said orifice of said T-shaped member, said hook having a body and an arm extending from the body, said arm including a generally uniformed size, said orifice at a top surface of said T-shaped member being form fitted around said hook arm, and said orifice of said hook unit base, said hook and said T-shaped member form a barrier to prevent contaminants from entering the clamp, and said T-shaped member orifice becoming larger as said arm extends through said T-shaped member providing additional area for receiving a portion of said hook below said top surface of said T-shaped member while said hook arm passes through the orifice in said top surface of said T-shaped member wherein said orifice is in said T-shaped member allowing said orifice to translate reciprocally back and forth in a linear path in said slot moving said orifice with said T-shaped member.

15. The clamp of claim 14 wherein said base having two pieces and said T-slot extends along an entire length thereof, said T-shaped member having two pieces.

16. The clamp of claim 14 wherein said hook having a generally L-shaped orifice therethrough and an angled surface thereon.

17. The clamp of claim 14 wherein said base angled cut out portions defined by an angled surface and a straight surface extending from one end of said angled surface.

18. The clamp of claim 14 wherein said T-shaped member slides along said T-slot, and said hook moves with respect to a surface of said T-shaped member when the clamp moves from a clamped to unclamped position or vice versa.

19. The clamp of claim 14 wherein said base having a plurality of fastening orifices therethrough.

* * * * *